(12) United States Patent
Sasaki et al.

(10) Patent No.: US 12,338,942 B2
(45) Date of Patent: Jun. 24, 2025

(54) SEAMLESS STEEL PIPE AND METHOD OF MANUFACTURE THEREOF

(71) Applicant: JFE STEEL CORPORATION, Tokyo (JP)

(72) Inventors: Shunsuke Sasaki, Tokyo (JP); Ryosuke Tachi, Tokyo (JP); Hiroyuki Yamasaki, Tokyo (JP); Hiroyuki Fukuda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 114 days.

(21) Appl. No.: 18/020,458

(22) PCT Filed: Jul. 21, 2021

(86) PCT No.: PCT/JP2021/027349
§ 371 (c)(1),
(2) Date: Feb. 9, 2023

(87) PCT Pub. No.: WO2022/038956
PCT Pub. Date: Feb. 24, 2022

(65) Prior Publication Data
US 2023/0265947 A1  Aug. 24, 2023

(30) Foreign Application Priority Data
Aug. 19, 2020  (JP) ................. 2020-138500

(51) Int. Cl.
*B21B 19/04* (2006.01)
*F16L 9/02* (2006.01)

(52) U.S. Cl.
CPC ............ *F16L 9/02* (2013.01); *B21B 19/04* (2013.01)

(58) Field of Classification Search
CPC ........... B21B 19/04; B21B 27/02; C21D 1/26; C21D 1/28; C21D 6/002; C21D 8/105;
(Continued)

(56) References Cited

U.S. PATENT DOCUMENTS

| 9,689,051 B2 | 6/2017 | Hatano et al. |
| 2012/0070682 A1* | 3/2012 | Hatano ............... C22C 38/04 |
| | | 428/586 |
| 2015/0285410 A1* | 10/2015 | Kochi ................ C21D 9/08 |
| | | 138/177 |

FOREIGN PATENT DOCUMENTS

| JP | H04-6218 A | 1/1992 |
| JP | H09-057329 A | 3/1997 |

(Continued)

OTHER PUBLICATIONS

Mar. 18, 2024 Extended European Search Report issued in European Patent Application No. 21858105.6.
(Continued)

*Primary Examiner* — Kevin Ct Li
(74) *Attorney, Agent, or Firm* — Oliff PLC (57) ABSTRACT

A seamless steel pipe has a $t/D_{out}$ of 0.05 to 0.40, where t is a wall thickness (mm) of the seamless steel pipe, and $D_{out}$ is an outside diameter (mm) of the seamless steel pipe. The seamless steel pipe has a maximum depth $d_{max}$ (mm)≤0.350 mm for defects in an inner surface of the steel pipe on a cross section perpendicular to a pipe axis. The seamless steel pipe has an average defect depth $d_{ave}$ (mm)≤0.200 mm for defects having a depth of 0.050 mm or more in the inner surface of the steel pipe. The seamless steel pipe, per millimeter of an inner circumferential length of the pipe, has at most 30 defects having a depth of 0.050 mm or more in the inner surface of the steel pipe.

9 Claims, 2 Drawing Sheets

(58) Field of Classification Search
CPC ......... C21D 9/08; C22C 38/001; C22C 38/02;
C22C 38/04; C22C 38/18; C22C 38/22;
C22C 38/40; C22C 38/44; C22C 38/54;
F16L 9/02; F16C 33/121; F16J 1/04
See application file for complete search history.

(56) References Cited

FOREIGN PATENT DOCUMENTS

| | | | |
|---|---|---|---|
| JP | 3082665 | B2 | 8/2000 |
| JP | 2001-247931 | A | 9/2001 |
| JP | 3463617 | B2 | 11/2003 |
| JP | 2007-125588 | A | 5/2007 |
| JP | 2008221250 | A * | 9/2008 |
| JP | 2016196040 | A * | 11/2016 |

OTHER PUBLICATIONS

Sep. 7, 2021 International Search Report issued in International Application No. PCT/JP2021/027349.
Oct. 4, 2022 Office Action issued in Japanese Patent Application No. 2021-562012.

* cited by examiner

ROUND ROD- OR PLATE-SHAPED
(DEPENDS ON THE FORM OF LINKAGE TO COMPRESSOR)

SEAMLESS STEEL PIPE AND METHOD OF MANUFACTURE THEREOF

TECHNICAL FIELD

This application relates to a seamless steel pipe and a method of manufacture thereof.

BACKGROUND

Production of a seamless steel pipe involves pierce rolling, which pierces a hole through a solid material, and wall thickness reduction and stretch rolling, which is performed to bring the wall thickness to a product size before the final sizing process (outside diameter reduction rolling) performed to provide an outside diameter of a size needed for the product. A seamless steel pipe is more reliable than a welded steel pipe made by bending and welding a steel plate because the material of a seamless steel pipe can have a more uniform cross sectional material property around the circumference. A seamless steel pipe can also provide a high section modulus because it can be easily made into a product shape having a thick wall relative to outside diameter. Because of these advantages, a seamless steel pipe has been widely used in applications such as in automobile parts, and heat-resistant steel pipes for boilers of electrical power plants.

PTL 1 discloses a method that includes cold drawing to produce a thick-walled thin seamless steel pipe such as those used for a variety of automobile shafts. PTL 2 discloses a thin seamless steel pipe containing at most 25.0% Cr and having desirable heat resistance.

CITATION LIST

Patent Literature

PTL 1: Japanese Patent Number 3082665
PTL 2: Japanese Patent Number 3463617

SUMMARY

Technical Problem

Pierce rolling and wall-thickness reduction and stretch rolling do not provide a steel pipe with a reduced outside diameter because the main purpose of these processes is to pierce a hole through the material by hot working and to reduce the wall thickness of steel pipe. In order to obtain a seamless steel pipe having predetermined dimensions, sizing (outside-diameter reduction rolling) is performed using a sizing mill. Because outside-diameter reduction rolling is a process that reduces the inside diameter, it prevents use of a tool against the inner surface, and the inner surface of steel pipe undergoes free deformation. This causes variation in wall thickness because the material in the inner surface of the steel pipe remains unrestrained and uncorrected. In other cases, because a circumferentially distributed uneven thickness that occurs in pierce rolling and wall-thickness reduction and stretch rolling is not corrected, it results in a product having a circumferentially distributed uneven thickness. A seamless steel pipe after sizing is made into a finished product either directly or after optional cold working (cold drawing). Various problems occur when a seamless steel pipe after sizing has a circumferentially distributed uneven thickness. For example, the weakest strength characteristics of a product occur in thinner portions of a circumferentially distributed uneven thickness. Because the product characteristics are warranted by portions with the lowest strength characteristics, a product cannot have high strength characteristics when it has a circumferentially distributed uneven thickness with thinner portions. Another issue is that different wall thicknesses at pipe joints create improper joints when pipes are welded end to end. Because of these drawbacks, strict standards are provided for control of external dimensions and circumferentially distributed uneven thickness of a steel pipe. The circumferentially distributed uneven thickness present in a seamless steel pipe remains even after cold drawing, and it is required to ensure that a steel pipe before cold working does not have a circumferentially distributed uneven thickness.

As discussed above, a circumferentially distributed uneven thickness creates various defects when present in a product. Against such defects caused by circumferentially distributed uneven thickness, there have been attempts to develop a steel pipe product having less circumferentially distributed uneven thickness. However, previous studies do not fully consider the influence of microscopic defects on fatigue characteristics of the product or manufacturability of a steel pipe in cold drawing when such defects are present in the inner surface of a seamless steel pipe. Here, "microscopic defects" means defects that are present in inner and outer surfaces of a steel pipe but are not detected as being harmful by inspection. Specifically, "microscopic defects" refers to a collection of microscopic defect of a depth that is at most 10% of the wall thickness. To date, it was unclear whether a seamless steel pipe actually causes problem when it has defects of such a microscopic depth, or when such fine defects are circumferentially distributed in large numbers in the inner surface of a steel pipe.

The disclosed embodiments have been made under these circumstances, and an object of the disclosed embodiments is to provide a seamless steel pipe having an improved fatigue life and that can be produced with an improved yield by reducing trouble that occurs during cold working when cold working (cold drawing) is performed. Another object of the disclosed embodiments is to provide a method for manufacturing such a seamless steel pipe.

Solution to Problem

The present inventors conducted thorough investigations of the shape and the distribution of defects of a microscopic depth in the inner surface of a steel pipe, and found that such defects occur during sizing, particularly when the reduction rate of outside diameter is high and the steel pipe has a thick wall, and that the defects affect the product quality when present in large numbers. It was also found that a steel pipe having these defects involves problems such as decrease of a lifetime of a tool used for subsequent cold working, and production stability. That is, our investigations led to the finding that even microscopic defects cause problems in a seamless steel pipe when the depth exceeds a certain level or when microscopic defects are circumferentially distributed in large numbers in the inner surface of a steel pipe.

For example, the shape of a seamless steel pipe requiring fatigue strength is designed to satisfy the required product life, taking into consideration the fatigue characteristics of the material, and the shape of a pipe cross section including a circumferentially distributed uneven thickness. Studies by the present inventors revealed that a steel pipe requiring a longer fatigue life cannot have the required lifetime when the depth of microscopic defects exceeds a certain level or when microscopic defects are circumferentially distributed in large numbers in the pipe inner surface, even when the wall thickness is sufficient in terms of strength design. That is, by restraining the microscopic defects, it would be possible to improve fatigue life without increasing wall thickness. This makes it possible to reduce the weight of steel pipe and reduce the material cost.

The presence of microscopic defects exceeding a certain depth, or the presence of microscopic defects circumferentially distributed in large numbers in the inner surface of a steel pipe was also found to be problematic because, in cold drawing of a base seamless steel pipe for example, the surface of a high-precision dice used for rolling of an inner surface becomes damaged when the steel pipe having such defects undergoes deformation as it is drawn between dies. The damaged dice surface, in turn, damages the inner surface of an incoming seamless steel pipe in the next cold drawing, and decreases the product yield. When more severely damaged, the damaged dice surface was found to cause various problems, including failed cold drawing due to galling.

The disclosed embodiments were completed on the basis of these findings, and the gist of the disclosed embodiments is as follows.

[1] A seamless steel pipe having a t/Dout of 0.05 to 0.40, where t is a wall thickness (mm) of the seamless steel pipe, and Dout is an outside diameter (mm) of the seamless steel pipe,
the seamless steel pipe having a maximum depth dmax (mm)≤0.350 for defects in an inner surface of the steel pipe on a cross section perpendicular to a pipe axis,
the seamless steel pipe having an average defect depth dave (mm)≤0.200 for defects having a depth of 0.050 mm or more in the inner surface of the steel pipe,
the seamless steel pipe, per millimeter of an inner circumferential length of the pipe, having at most 30 defects having a depth of 0.050 mm or more in the inner surface of the steel pipe.

[2] The seamless steel pipe according to [1], which comprises ferrite grains having an average grain size of 15 μm or less, or prior austenite grains having an average grain size of 15 μm or more.

[3] The seamless steel pipe according to [1], which comprises, in mass %, C: 0.05 to 0.45%, Si: 0.05 to 0.45%, and Mn: 0.05 to 1.2% as chemical components.

[4] The seamless steel pipe according to [3], which further comprises, in mass %, Cr: less than 4.5% as a chemical component, and contains ferrite grains having an average grain size of 15 μm or less.

[5] The seamless steel pipe according to [3], which further comprises, in mass %, Cr: 4.5 to 9.5% as a chemical component, and contains prior austenite grains having an average grain size of 15 μm or more.

[6] The seamless steel pipe according to any one of [3] to [5], which further comprises, in mass %, one or more selected from Ni: 0.5% or less, Mo: 1.5% or less, W: 2.5% or less, N: 0.10% or less, and B: 0.010% or less as chemical components.

[7] A method for manufacturing a seamless steel pipe of any one of [1] to [6],
the method comprising pierce rolling, wall-thickness reduction and stretch rolling, and sizing, and satisfying the following formula (1), $$(D_{ini}-D_{out})^2 \times t_0^2 \times GD^2 \leq 9980 \qquad (1),$$

where GD is an average grain size (mm) of austenite before sizing, Dini is a steel pipe outside diameter (mm) before sizing, Dout is a steel pipe outside diameter (mm) after sizing, and to is a wall thickness (mm) before sizing.

[8] The method according to [7], wherein the sizing is followed by a heat treatment performed at a heating temperature of 850 to 1,150° C. with at least 10 minutes of soaking retention time.

Advantageous Effects

A seamless steel pipe of the disclosed embodiments enables improvement of fatigue life, and can improve the yield by reducing trouble that occurs during cold working when cold working (cold drawing) is performed.

DETAILED DESCRIPTION

Figure 1:
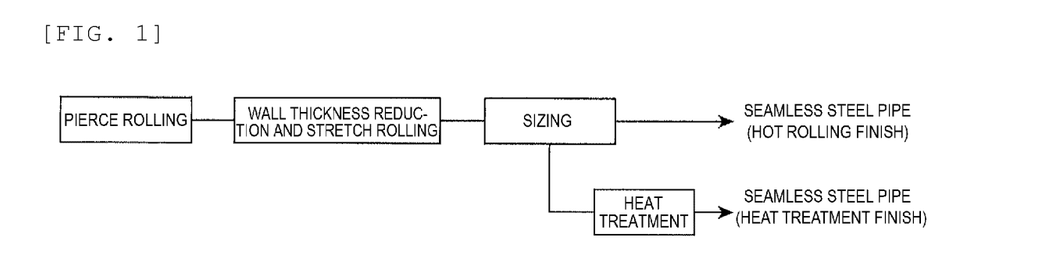
FIG. 1 represents a manufacturing process of a seamless steel pipe.

An embodiment of the disclosed embodiments is described below, with reference to the accompanying drawings. FIG. 1 is a diagram representing a manufacturing process of a seamless steel pipe. The pierce rolling method used in a manufacturing process of the disclosed embodiments may be hot extrusion, which is effective for hot forming of difficult-to-process materials such as high alloys, or a Mannesmann method, which is suited for mass production. The wall-thickness reduction and stretch rolling may be a process using any of an elongator, a plug mill, a mandrel mill, and a push bench. The sizing of interest is outside-diameter reduction rolling using caliber rolls such as sizers and reducers. That is, the sizing reduces the outside diameter of a pipe with caliber rolls so that the blank after rolling has a smaller outside diameter than that before rolling.

The present inventors found that the causes of microscopic defects are the circumferential compressive strain that is generated during outside-diameter reduction rolling, and the thickness increasing strain associated with the circumferential compressive strain. It was also found that, in addition to these forms of strain, the microstructure of the material subjected to outside-diameter reduction rolling also affects generation of fine defects.

Figure 2:
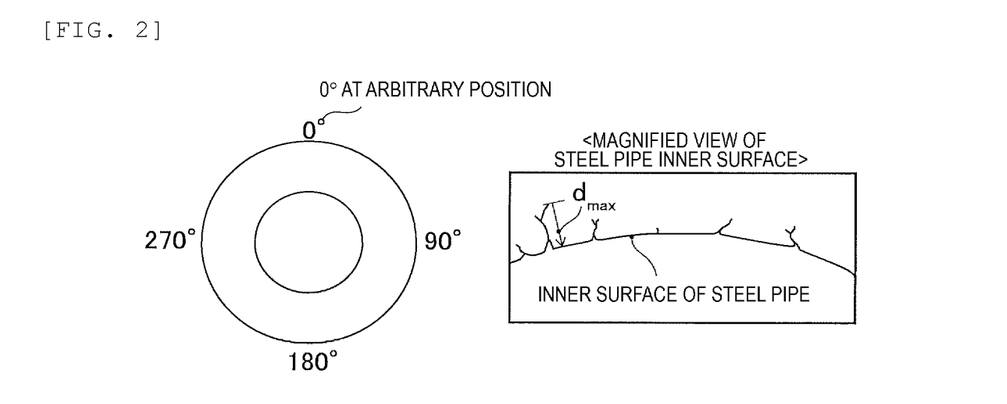
FIG. 2 shows forms of fine defects generated in the inner surface of a seamless steel pipe.

FIG. 2 shows forms of fine defects generated in the inner surface of a seamless steel pipe. The present inventors found that when a steel pipe has a maximum depth dmax (mm) ≤0.350 for defects in an inner surface of the steel pipe on a cross section perpendicular to a pipe axis, an average defect depth dave (mm)≤0.200 for defects having a depth of 0.050 mm or more in the inner surface of the steel pipe, and at most 30 defects having a depth of 0.050 mm or more in the inner surface of the steel pipe per millimeter of an inner circumferential length of the pipe, the fatigue life can be improved, and when secondary working (cold drawing) is performed, accompanying trouble can be reduced to improve yield.

In the disclosed embodiments, the mechanical properties and heat resistance performance of the product deteriorate when the maximum depth dmax (mm) of microscopic defects (hereinafter, also referred to simply as "fine defects") in the inner surface of the steel pipe on a cross section perpendicular to the pipe axis exceeds 0.350 mm. When the average defect depth dave (mm) of defects having a depth of 0.050 mm or more in the inner surface of steel pipe exceeds 0.200 mm, the mechanical properties and heat resistance performance of the product also deteriorate, and such defects damage the surface of a tool used in cold working, and shorten the tool life. Similarly, when the number of defects having a depth of 0.050 mm or more in the inner surface of steel pipe exceeds 30 per millimeter of an inner circumferential length of the pipe, the mechanical properties and heat resistance performance of the product deteriorate, and such defects damage the surface of a tool used in cold working, and shorten the tool life.

Here, a depth of a defect in the inner surface of a steel pipe refers to a depth directed from the inner to outer surface of a steel pipe (depth direction). The depth and distribution of defects can be determined by observing a cross section taken by cutting a steel pipe. For example, a cross section can be taken by cutting a steel pipe at a middle portion between the pipe ends, and can be observed with a microscope after polishing the surface. In the case where it is not desirable for manufacture reasons to cut the steel pipe at a middle portion between the pipe ends, a cross section to be observed can be taken by cutting the steel pipe at the front or rear end of steel pipe. In sizing of a seamless steel pipe, fine defects tend to occur in greater numbers at the rolling ends because these portions experience tension differently from the steady portion. When examining fine defects at the front and rear ends, it is therefore preferable to take a cross section by cutting the steel pipe at a portion away from the front or rear end by a distance of at least 10 Dout, where Dout is the outside diameter of a steel pipe after rolling with a sizing mill. A cross section may be observed over the whole inner surface of the steel pipe (0 to 360° around the circumference of a pipe cross section). As noted above, a depth of a defect refers to a depth directed from the inner to outer surface of a steel pipe (depth direction). In other words, a depth of a defect is a depth along a normal line of an arc formed by the inner surface of a steel pipe, as in dmax in FIG. 2 (the direction of depth is right angle to the inner surface of the steel pipe).

In the disclosed embodiments, steel pipe outside diameter Dout (mm) and steel pipe wall thickness t (mm) satisfy t/Dout=0.05 to 0.40, in order to reduce fine defects. The lower limit of t/Dout is 0.05 because fine defects do not pose problems when the wall thickness is thin relative to outside diameter. The upper limit of t/Dout is 0.40 because sizing into a pipe shape is difficult to achieve when the wall thickness is too large relative to outside diameter.

Preferably, a seamless steel pipe of the disclosed embodiments is a steel pipe with a small thickness and having an outside diameter of 57.2 mm or less.

Preferably, a seamless steel pipe of the disclosed embodiments contains ferrite grains having an average grain size of 15 μm or less. This is to improve mechanical properties such as strength and toughness. The lower limit of grain size is not particularly limited. However, the lower limit of grain size is preferably 0.5 μm because, when the grains are too small, the grain refinement effect results in an excessively high strength, and formability decreases in subsequent processes.

In a seamless steel pipe of the disclosed embodiments, the prior austenite grains have an average grain size of preferably 15 μm or more when the Cr content is 4.5 to 9.5%. The steel pipe can have improved heat resistance performance when the prior austenite grains have an average grain size of 15 μm or more. Adding Cr improves quenchability (austenite transforms into martensite, not ferrite, upon cooling from a hot state). Because the microstructure depends on Cr content, the ferrite grain sizes are measured for ferrite grains when the Cr content is less than 4.5%. For steel pipes with a Cr content of 4.5% or more, the prior austenite grain sizes in martensite are measured as particle sizes of hot austenite before transformation. The grain size of prior austenite can be measured with a light microscope after corroding the prior austenite grains. A crystal orientation analysis can also be used for the measurement of grain size. The upper limit of the average grain size of prior austenite grains is not particularly limited. However, the upper limit is preferably 300 μm because the mechanical properties deteriorate when the grain size is too large.

Preferably, a seamless steel pipe of the disclosed embodiments has the composition below. The percentage indication for the components of the composition is mass %, unless otherwise specifically stated.

C: 0.05 to 0.45%

Carbon is an important element that affects the strength characteristics of a steel pipe product. The preferred C content for obtaining desirable strength characteristics is 0.05% or more, and high strength can be obtained with this range of C content. Higher C contents are preferred in terms of improving strength. However, an overly high C content impairs cold workability and weldability. In this respect, the C content is preferably 0.45% or less. The preferred C content for satisfying strength, cold workability, and weldability is 0.08 to 0.38%.

Si: 0.05 to 0.45%

Si is effective at increasing steel strength. The preferred Si content for obtaining this effect is 0.05% or more. However, Si causes embrittlement during hot working when contained in large amounts. In this respect, the Si content is preferably 0.45% or less. The preferred Si content for satisfying both strength and workability is 0.10 to 0.30%.

Mn: 0.05 to 1.2%

Mn is effective at increasing strength. The preferred Mn content for obtaining this effect is 0.05% or more. However, when contained in large amounts, Mn creates an unstable ferritic phase at ordinary temperature, and the remaining retained austenite decreases fatigue strength. In this respect, the Mn content is preferably 1.2% or less. The preferred Mn content for satisfying both strength and fatigue characteristics is 0.15 to 0.80%.

Cr may be contained as an additional element in the disclosed embodiments.

Cr: 4.5 to 9.5%

Cr is an element that improves steel quenchability, high-temperature strength, and high-temperature oxidation resistance characteristics, and is useful for stably obtaining strength characteristics, high-temperature strength, and high-temperature oxidation resistance characteristics. The preferred Cr content is 4.5% or more for materials requiring mechanical properties, high-temperature strength, and high-temperature oxidation resistance characteristics. Because quenchability, high-temperature strength, and high-temperature oxidation resistance performance decrease with decrease of Cr content, the Cr content can be adjusted as appropriate according to the required high-temperature strength and high-temperature oxidation resistance performance. The preferred Cr content is 5.0% or more in applications where heat resistance performance and fatigue life are needed. The Cr content is more preferably 7.5% or more to enable use in higher temperature ranges. High-temperature oxidation resistance performance improves with increase of Cr content, and the upper limit of Cr content is not particularly limited. However, with increasing Cr contents, it becomes increasingly difficult to achieve refinement of grain size during hot rolling, and fine defects tend to be generated more easily during sizing. In this respect, the Cr content is preferably 9.5% or less. For desirable fine defects and high-temperature oxidation resistance characteristics, the Cr content is more preferably 7.5 to 9.0%.

Adding Cr increases the alloy cost when high mechanical properties, high-temperature strength, and high-temperature oxidation resistance characteristics are not required. Because an increase of Cr content leads to decrease of cold formability at the expense of the improved characteristics, the Cr content is preferably less than 4.5% when high cold formability is needed. For more stable cold formability, the Cr content is more preferably less than 1.5%.

In addition to the foregoing components, one or more of Ni, Mo, W, N, and B may be contained in the disclosed embodiments. The following describes the reasons for limiting the contents of these additional elements.

Ni is effective for toughness. Ni is added in an amount of preferably in the range of 0.51 or less when toughness is needed. The Ni content is more preferably 0.10 to 0.30.

Mo is effective for heat treatment characteristics and heat resistance, and is added in an amount of preferably in the range of 1.5% or less. The Mo content is more preferably 0.3 to 1.3%.

W is effective for heat resistance performance, and is added in an amount of preferably 2.5% or less. The W content is more preferably in the range of 1.0 to 2.0%.

N is effective at improving strength, and is added in an amount of preferably 0.10% or less. The N content is more preferably in the range of 0.01 to 0.08%.

B is effective at improving heat resistance and hot workability, and is added in an amount of preferably 0.010% or less. The B content is more preferably in the range of 0.0005 to 0.005%.

The balance is Fe and incidental impurities. The acceptable incidental impurities are, for example, P: 0.030% or less, and S: 0.008% or less.

The following describes a method for manufacturing a seamless steel pipe of the disclosed embodiments.

A feature of a method of the disclosed embodiments is that the method includes pierce rolling, wall-thickness reduction and stretch rolling, and sizing, and satisfies the following formula (1), $$(D_{ini}-D_{out}) \times t_0^2 \times GD^2 \leq 9980 \quad (1),$$

where GD is an average grain size (mm) of austenite before sizing, Dini is a steel pipe outside diameter (mm) before sizing, Dout is a steel pipe outside diameter (mm) after sizing, and to is a wall thickness (mm) before sizing.

The following discusses how the formula (1) was derived.

The inventors conducted various investigations to elucidate the mechanism of fine defect generation. First, the inventors closely studied the forms of strains that occur in the inner surface of a steel pipe during sizing. The studies led to the finding that sizing, which reduces the outside diameter under a large compressive strain circumferentially generated in steel pipe, also involves a strain that simultaneously occurs in the free-deforming inner surface along the thickness direction, and causes thickness increasing deformation in the inner surface of steel pipe. The inventors envisaged that changes occurring in such unique strains could be the cause of fine defects in the inner surface of steel pipe.

On the other hand, the amount of fine defect is not necessarily the same, and fine defects occur to different extents even in products having the same outside diameter and the same wall thickness. That is, it was unclear why the extent of fine defect is different even when outside-diameter reduction rolling is performed under the same conditions using the same equipment. Further investigations by the inventors revealed that, in addition to the forms of strains due to the outside-diameter reduction rolling during sizing, the microstructure of the material subjected to outside-diameter reduction rolling is another factor that affects the extent of fine defect. This led to the examination of the influence of sizing conditions and microstructure, based on simulations of the unique forms of sizing strains.

Figure 3:
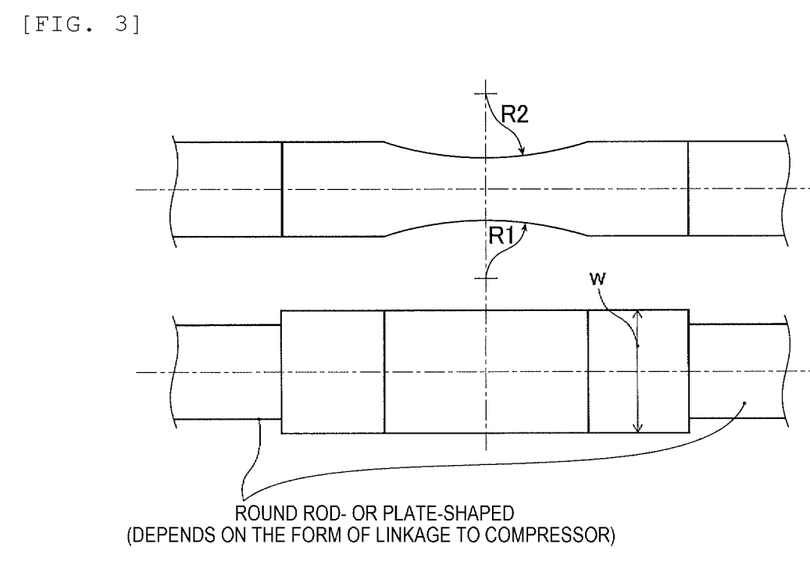
FIG. 3 shows the shape of a test specimen used to examine a relationship between sizing conditions and grain size.

Specifically, the inventors conducted a sizing simulation test to examine the influence of sizing conditions and microstructure, as follows. FIG. 3 shows the shape of a specimen used for the sizing simulation test conducted to examine how the reduction rate of steel pipe diameter and the grain size affect generation of fine defects in the disclosed embodiments. The test specimen is shaped to enable, despite being small, a simulation of sizing reduction of outside diameter and thickness increasing strain solely by controlling uniaxial compression. This allows for use of, for example, a general-purpose uniaxial compression tester (Thermec Master or Gleeble tester). Some of commercially available general-purpose testers are equipped with a DC resistive heating device or an IH heating device using coil, and can be used to easily simulate the temperature history which is generated during hot working.

The following describes a method of simulation of sizing strain controllable with the shape of the test specimen shown in FIG. 3. The upper case in FIG. 3 shows the test specimen as viewed in an L-t direction (L: length of test specimen; t: wall thickness of test specimen). The lower case shows the test specimen as viewed in an L-w direction (w: width of test specimen). The ends of the test specimen may have a round-rod or a plate shape, as appropriately changed according to the way the test specimen is connected to a compressor. When shaped as shown in FIG. 3, the test specimen, in response to an axial compressive displacement, experiences a large compressive strain in the evaluation surface (R1 in FIG. 3) at a halfway point between the ends, where R1 representing the evaluation surface is a part of test specimen used to simulate the inner surface of a steel pipe under sizing. When the curvature radius of R1 forming the evaluation surface is greater than the curvature radius of R2 opposite the evaluation surface, the evaluation surface simulating the inner surface undergoes bending as the axial compressive displacement increases, and experiences a high thickness increasing strain in the middle portion. The balance between compressive strain and thickness increasing strain, and the magnitudes of these strains can be easily controlled by controlling the amount of compressive displacement and the value of R1/R2, and this enables an accurate simulation of outside-diameter reduction rolling in any type of sizing. The width w, may have any value. However, provided that there is no interference with the compressor, a larger width w is preferred because the evaluation surface can have a more stable stress state with larger values of width w. Preferably, the lower limit of width w is equal to or greater than the stroke length of the test specimen under compression. The test specimen shown in FIG. 3 may have any size, and can be fabricated in small sizes. For example, a small steel ingot of the same components to be included in the product may be prepared by casting, and the ingot may be subjected to the desired hot rolling or heat treatment to cause change in the form of microstructure. The steel ingot can then be cut into a test specimen for sizing simulation to enable easy evaluation. The test specimen to be used for testing may also be prepared by cutting a material taken from the steel before sizing. The simulation test enables evaluations of, for example, the influence of grain size differences, and the influence of compression direction of test specimen on rolling texture, and the influence of temperature and strain.

The inventors conducted the sizing simulation test to find a solution to the issues discussed above in the Background Art section. In the test, the inventors determined the amount of strain (the amount of compression stroke in FIG. 3) simulating the circumferential compressive strain that is generated in the inner surface of a steel pipe during sizing. Separately, the average grain size was determined using the intercept method by measuring grain sizes in advance before deformation, using a microscope. An investigation of the relationship between grain size before deformation and fine defect provided new information regarding the influence of work conditions and microstructure (average grain size before deformation) on fine defect.

For different steel grades, the test specimen of FIG. 3 was used in a sizing simulation test conducted by varying the steel pipe outside diameter Dini before sizing, the steel pipe outside diameter Dout after sizing, and the wall thickness to before sizing. After the test, the test specimen was measured for dmax and dave, and the grain size was compared with the grain size of austenite before testing. The grain size of austenite before sizing was measured by cutting a pipe end with a hot saw before sizing, and observing the cropped pipe after cooling. The prior austenite grain boundary on the pipe end was corroded at the middle of wall thickness and at the surface portion of inner surface, and was observed with a light microscope for the measurement of average grain size by the intercept method. It was found that problems caused by fine defects can be overcome by satisfying the following formula (1).

$$(D_{ini}-D_{out})^2 \times t_0^2 \times GD^2 \leq 9980 \tag{1}$$

By satisfying this formula, it is possible to reduce the fine defects that are generated in the inner surface of steel pipe, and improve the product fatigue life. It is also possible to provide a seamless steel pipe having desirable cold drawability. The steel pipe outside diameter Dout after sizing is the same as the steel pipe outside diameter Dout of the product.

To satisfy formula (1), it is advantageous to make the difference between Dini and Dout smaller, and/or to make the wall thickness to, smaller, where Dini is the outside diameter of steel pipe before sizing, and Dout is the outside diameter of steel pipe after sizing. The sizing conditions may be appropriately decided to satisfy formula (1).

It is preferable when the microstructure after wall-thickness reduction and stretch rolling and before sizing has smaller austenite grain sizes GD. Smaller grain sizes can be provided by varying the chemical components of material such as by adding pinning elements that inhibit grain growth during heating. It is, however, more preferable to employ a method using recrystallization or reverse transformation, after wall-thickness reduction and stretch rolling and before sizing. Recrystallization can be achieved by increasing the reduction rate, and refinement of grain size occurs as a result of recrystallization. Preferably, to inhibit grain growth after recrystallization, the reduction rate is increased in the wall thickness reduction and stretching step, immediately before sizing.

Refinement by recrystallization is closely related to the chemical elements of material, particularly Cr. When adding Cr, it is accordingly important to choose appropriate rolling conditions for wall-thickness reduction and stretch rolling. In recrystallization, refinement of grain size can more easily be achieved when the rolling temperature is at least 800+ 25*Cr+5*Mo (° C.) (Cr and Mo represent contents in steel, in mass %) and when the wall thickness reduction and stretching step is performed at such a speed that rolling with a reduction rate of 50% or more finishes within 10 seconds. Further rolling reduction does not pose any problem; however, the effect of recrystallization becomes saturated, and excessive rolling reduction adds an increased load on the equipment used for rolling. It is accordingly preferable to manage rolling reduction at 80% or less. The rolling temperature is preferably 1,150° C. or less because an overly high rolling temperature causes coarsening of grain size as a result of grain growth after recrystallization.

Reverse transformation is a process whereby the austenitic phase after wall-thickness reduction and stretch rolling and before sizing is cooled to a temperature equal to or less than the ferrite transformation point, which occurs in a temperature range of 300° C. or less, followed by reheating for transformation of the austenitic phase. By performing this process before sizing, the austenite grain size after reheating can have a refined state prior to sizing. Preferably, cooling starts at a cooling start temperature of 650° C. or more because cooling is more effective when it is started from the austenitic phase in a hot state. The average cooling rate before reverse transformation, and the average heating rate of reverse transformation are preferably 1.0° C./s or more because further refinement of austenite grain size is possible by increasing these rates. Because the average cooling rate particularly influences the grain size, a greater effect can be obtained when the average cooling rate is preferably 5.0° C./s or more. Preferably, the average cooling rate and average heating rate are 20° C./s or less because thermal stress may cause cracking when these rates are overly high. Recrystallization and reverse transformation produce an improved effect when performed in combination, and both recrystallization and reverse transformation may be performed when further reduction of fine defect is desired. Reverse transformation is not particularly restricted with regard to reduction rate. However, reverse transformation typically involves a reduction rate of 50% or less because wall thickness reduction always occurs in the wall thickness reduction step.

The product after sizing may be subjected to a heat treatment. In the disclosed embodiments, because a fine defect occurs during sizing, a following heat treatment does not affect the inner surface quality of steel pipe when generation of fine defect can be reduced during sizing. A heat treatment after sizing produces a desirable balance of strength and toughness. Preferably, the product after sizing is subjected to a heat treatment at a heating temperature of 850 to 1,150° C. with a soaking retention time of at least 10 minutes. When the steel is containing at least 4.5% Cr, it is preferable to perform a heat treatment at 950 to 1,150° C. for at least 15 minutes, followed by gradual cooling at 1° C./s or less, because the steel can have desirable strength against heat when heat treated under these conditions.

The disclosed embodiments can be implemented as a seamless steel pipe manufacturing method. Specifically, an original steel pipe after pierce rolling, wall thickness reduction, and stretch rolling is cut at a pipe end before sizing (an original steel pipe after the reverse transformation and recrystallization process when recrystallization and/or reverse transformation are performed), and a sample after cooling is measured for average grain size GD (mm) of austenite to perform a test whether the steel satisfies the following formula (1).

$$(D_{ini}-D_{out})^2 \times t_0^2 \times GD^2 \leq 9980 \tag{1},$$

where Dini is the steel pipe outside diameter (mm) before sizing, Dout is the steel pipe outside diameter (mm) after sizing, and to is the wall thickness (mm) before sizing.

The test is performed at least once for each material of the same size and the same strength grade in terms of a product seamless steel pipe. A blank after wall thickness reduction and stretch rolling is determined as having passed the test when it satisfies formula (1), and a blank having the same size and the same strength grade as the blank that has passed the test is sized to produce a seamless steel pipe.

In the disclosed embodiments, the manufacturing conditions for pierce rolling and wall-thickness reduction and stretch rolling are not particularly restricted, and the pierce rolling method may be hot extrusion, which is effective for hot forming of difficult-to-process materials such as high alloys, or a Mannesmann method, which is suited for mass production, as noted above. The wall-thickness reduction and stretch rolling may be a process using any of an elongator, a plug mill, a mandrel mill, and a push bench.

EXAMPLES

The following describes Examples. A steel having the chemical components shown in Table 1 was made into a round billet having a diameter Ø of 130 to 150 mm, and the billet was subjected to Mannesmann pierce rolling and wall-thickness reduction and stretch rolling mandrel-mill, followed by sizing with a reducer. For sizing, the steel pipe outside diameter Dini before sizing and the steel pipe outside diameter Dout after sizing were measured, and the ratio of these diameters was calculated. The steel pipe after sizing had a wall thickness t (the wall thickness of a product steel pipe) with a t/Dout of 0.061 to 0.315. The seamless steel pipe produced had an outside diameter of 24.5 to 57.2 mm.

Recrystallization or reverse transformation, or both of these techniques were used to bring about change in austenite grain size. For recrystallization, the reduction rate was varied in wall thickness reduction rolling, which was performed in a temperature range of 850 to 1,150° C. before sizing, and the wall thickness of the steel pipe was cumulatively reduced for 1.0 to 9.5 s. The values of cumulative reduction rate are shown in the table. For reverse transformation, the steel pipe after wall-thickness reduction and stretch rolling was cooled to a temperature of 300° C. or less and ordinary temperature at different average cooling rates shown in the table, and was reheated to 850° C. or more. The steel was reheated by atmospheric heating, at an average heating rate of 0.5 to 5.0° C./s depending on the wall thickness. For the measurement of prior austenite grain size before sizing, an original steel pipe was cut at a pipe end before sizing (an original steel pipe after the reverse transformation and recrystallization process when recrystallization and/or reverse transformation are performed), and a sample after cooling was observed and measured for prior austenite grain size, GD. The measured value of prior austenite grain size GD was then used to calculate formula (1). For observation of microstructure, the same test specimen was observed in three different fields of view with a light microscope or scanning electron microscope (SEM) at 400 to 2,000 times magnification, and a mean value was calculated.

After sizing, the seamless steel pipe was cut into a cross section at a middle portion between the ends of steel pipe, and the inner surface of steel pipe was observed for fine defects on the cross section after polishing the cut surface to mirror finish. The inner surface of steel pipe was observed over a range of between 0° and 360° on the cross section. The fine defects observed in the inner surface of steel pipe were measured to determine the maximum defect depth, dmax, the average defect depth, dave, of defects having a depth of 0.050 mm or more, and the number of defects having a depth of 0.050 mm or more.

Some of the seamless steel pipes with a Cr content of less than 4.5% were subjected to a heat treatment performed by quenching and tempering at the temperatures shown in Table 2 (quenching temperature, Q, tempering temperature, T). Some of the seamless steel pipes with a Cr content of 4.5% or more were subjected to a heat treatment in which the seamless steel pipes were retained for 15 minutes at the annealing temperature, N, shown in Table 2, and were allowed to gradually cool at an average cooling rate of 1° C./s.

The seamless steel pipes after sizing or heat treatment were cut into a cross section, and the microstructure in a middle portion of the wall thickness on the cross section was observed to measure the average grain size of ferrite in the case of materials containing less than 4.5% Cr, and the average grain size of prior austenite in the case of materials containing at least 4.5% Cr. The average grain sizes were determined by measuring grain sizes using the intercept method.

The seamless steel pipes after sizing or heat treatment were used to evaluate fatigue life. For evaluation of fatigue life, the seamless steel pipe was cut into a piece having half the length of the outside diameter, and was compressed with flat plates at opposing outer circumferential positions so that an adjusted stress equal to the yield strength of steel pipe previously measured in compliance with JIS Z 2241 is generated. The fatigue life was then determined by measuring the number of times the stress was applied at a repeated cycle of 2 Hz before fatigue failure.

The seamless steel pipes after sizing or heat treatment were also used to evaluate the lifetime of a tool used for rolling of steel pipe inner surface in cold drawing performed to reduce the outside diameter by 10% and the wall thickness by 15%. The lifetime of the tool was determined as the number of times the tool was used before it was no longer usable (the tool was determined as being unusable when it was damaged, and the product had a poor inner surface quality).

For evaluation, fatigue life and tool life were calculated as values relative to the value of 1 assigned to a seamless steel pipe of Comparative Example having the same component, the same outside diameter, and the same wall thickness.

The results are presented in Table 2.

TABLE 1

| | Chemical composition of steel (mass %, the balance being Fe and inevitable impurities) | | | | | | | | |
|---|---|---|---|---|---|---|---|---|---|
| | C | Si | Mn | Cr | Ni | Mo | W | N | Other |
| Steel grade 1 | 0.06 | 0.06 | 0.03 | 0.1 | 0.02 | — | — | 0.01 | P: 0.013, S: 0.001 |
| Steel grade 2 | 0.46 | 0.15 | 0.35 | 1.5 | 0.15 | 0.35 | — | 0.02 | P: 0.013, S: 0.002 |

TABLE 1-continued

| | Chemical composition of steel (mass %, the balance being Fe and inevitable impurities) | | | | | | | | |
|---|---|---|---|---|---|---|---|---|---|
| | C | Si | Mn | Cr | Ni | Mo | W | N | Other |
| Steel grade 3 | 0.14 | 0.42 | 0.75 | 9.2 | 0.25 | 1.15 | 1.75 | 0.08 | P: 0.015, S: 0.003, B: 0.003 |
| Steel grade 4 | 0.08 | 0.15 | 0.31 | 8.6 | — | 0.95 | — | 0.05 | P: 0.014, S: 0.003 |
| Steel grade 5 | 0.35 | 0.15 | 0.15 | — | — | — | — | 0.02 | P: 0.014, S: 0.004 |
| Steel grade 6 | 0.32 | 0.95 | 0.23 | 4.8 | 0.05 | 1.02 | — | 0.03 | P: 0.014, S: 0.005 |

TABLE 2

| No. | Steel grade | Dout/Dini | t/Dout | Grain refinement method | Reduction rate before sizing (%) | Stretch and wall thickness reduction rolling temperature °C | Cooling rate before sizing (°C./s) | GD (mm) | Left-hand value of formula (1) | dmax (mm) |
|---|---|---|---|---|---|---|---|---|---|---|
| 1 | 1 | 0.35 | 0.131 | Recrystallization | 62 | 950 | — | 0.25 | 8078 | 0.294 |
| 2 | 1 | 0.35 | 0.210 | Recrystallization | 50 | 940 | — | 0.15 | 7444 | 0.263 |
| 3 | 1 | 0.35 | 0.315 | Reverse transformation | 25 | 950 | 7.5 | 0.12 | 9845 | 0.340 |
| 4 | 1 | 0.35 | 0.131 | — | 38 | 950 | — | 0.49 | 31031 | 0.361 |
| 5 | 1 | 0.35 | 0.210 | — | 27 | 950 | — | 0.45 | 66998 | 0.570 |
| 6 | 1 | 0.35 | 0.315 | — | 25 | 950 | — | 0.35 | 91192 | 0.769 |
| 7 | 2 | 0.22 | 0.204 | Recrystallization | 62 | 1000 | — | 0.09 | 1320 | 0.053 |
| 8 | 2 | 0.22 | 0.204 | — | 38 | 1000 | — | 0.30 | 16448 | 0.578 |
| 9 | 3 | 0.35 | 0.079 | Recrystallization + reverse transformation | 73 | 1150 | 4.5 | 0.08 | 298 | 0.090 |
| 10 | 3 | 0.35 | 0.184 | Recrystallization + reverse transformation | 50 | 1150 | 4.5 | 0.09 | 1830 | 0.139 |
| 11 | 3 | 0.35 | 0.236 | Reverse transformation | 36 | 1000 | 3.5 | 0.10 | 4187 | 0.150 |
| 12 | 3 | 0.35 | 0.315 | Reverse transformation | 33 | 990 | 3 | 0.12 | 9845 | 0.340 |
| 13 | 3 | 0.35 | 0.079 | — | 13 | 1050 | — | 0.51 | 12102 | 0.454 |
| 14 | 3 | 0.35 | 0.184 | — | 36 | 1050 | — | 0.35 | 31031 | 0.535 |
| 15 | 3 | 0.35 | 0.236 | — | 18 | 1050 | — | 0.41 | 70390 | 0.597 |
| 16 | 3 | 0.35 | 0.315 | — | 47 | 1000 | — | 0.17 | 21514 | 0.489 |
| 17 | 4 | 0.52 | 0.061 | Recrystallization + reverse transformation | 68 | 1030 | 16.5 | 0.05 | 85 | 0.008 |
| 18 | 4 | 0.52 | 0.061 | Recrystallization | 68 | 1030 | — | 0.25 | 2134 | 0.096 |
| 19 | 4 | 0.52 | 0.061 | — | 22 | 1000 | — | 0.59 | 11687 | 0.448 |
| 20 | 4 | 0.52 | 0.157 | Recrystallization + reverse transformation | 61 | 1050 | 8.5 | 0.05 | 565 | 0.024 |
| 21 | 4 | 0.52 | 0.157 | — | 36 | 1000 | — | 0.25 | 14113 | 0.495 |
| 22 | 5 | 0.35 | 0.210 | Reverse transformation | 43 | 1000 | 20 | 0.12 | 4764 | 0.171 |
| 23 | 5 | 0.35 | 0.262 | Recrystallization + reverse transformation | 58 | 1000 | 20 | 0.06 | 1621 | 0.060 |
| 24 | 5 | 0.35 | 0.210 | — | 27 | 1000 | — | 0.33 | 36030 | 0.617 |
| 25 | 5 | 0.35 | 0.262 | — | 29 | 850 | — | 0.35 | 64418 | 0.546 |
| 26 | 6 | 0.35 | 0.262 | — | 35 | 980 | — | 0.49 | 124122 | 1.047 |
| 27 | 6 | 0.35 | 0.262 | Recrystallization | 68 | 980 | — | 0.11 | 6255 | 0.055 |
| 28 | 6 | 0.35 | 0.262 | Reverse transformation | 35 | 980 | 2.5 | 0.05 | 1292 | 0.012 |

| No. | dave (mm) | Number of defects having a depth of 0.050 mm or more per millimeter of inner circumferential length of pipe | Heat treatment | Prior austenite grain (μm) | Ferrite gram (μm) | Fatigue life (relative value) | Tool life (relative value) | Reference comparative example | Remarks |
|---|---|---|---|---|---|---|---|---|---|
| 1 | 0.139 | 11 | — | | 25 | 1.6 | 1.14 | No. 4 | PE |
| 2 | 0.125 | 13 | — | | 18 | 2.8 | 1.23 | No. 5 | PE |
| 3 | 0.162 | 25 | — | | 8 | 3.6 | 1.32 | No. 6 | PE |
| 4 | 0.172 | 36 | — | | 33 | 1.0 | 1.00 | — | CE |
| 5 | 0.272 | 60 | — | | 36 | 1.0 | 1.00 | — | CE |
| 6 | 0.368 | 113 | — | | 42 | 1.0 | 1.00 | — | CE |
| 7 | 0.025 | 3 | Q: 850° C., T: 680° C. | | 7 | 7.3 | 1.36 | No. 8 | PE |
| 8 | 0.197 | 50 | — | | 35 | 1.0 | 1.0 | — | CE |
| 9 | 0.040 | 0 | — | 6 | | 5.5 | 1.22 | No. 13 | PE |
| 10 | 0.065 | 3 | N: 850° C. | 18 | | 10.2 | 1.21 | No. 14 | PE |
| 11 | 0.071 | 11 | N: 1150° C. | 28 | | 11.3 | 1.20 | No. 15 | PE |
| 12 | 0.162 | 29 | N: 900° C. | 18 | | 3.4 | 1.12 | No. 16 | PE |
| 13 | 0.214 | 38 | — | | 13 | 1.0 | 1.00 | — | CE |
| 14 | 0.255 | 32 | N: 850° C. | 18 | | 1.0 | 1.00 | — | CE |
| 15 | 0.381 | 62 | N: 1150° C. | 28 | | 1.0 | 1.00 | — | CE |
| 16 | 0.351 | 122 | N: 900° C. | 18 | | 1.0 | 1.00 | — | CE |
| 17 | 0.003 | 6 | N: 1100° C. | 26 | | 11.5 | 1.33 | No. 19 | PE |
| 18 | 0.044 | 16 | N: 1100° C. | 26 | | 8.8 | 1.23 | No. 19 | PE |
| 19 | 0.210 | 31 | N: 1100° C. | 26 | | 1.0 | 1.00 | — | CE |
| 20 | 0.011 | 9 | — | 11 | | 9.5 | 1.23 | No. 21 | PE |
| 21 | 0.197 | 46 | — | 19 | | 1.0 | 1.00 | — | CE |
| 22 | 0.081 | 5 | — | | 8 | 16.50 | 1.32 | No. 24 | PE |
| 23 | 0.028 | 4 | — | | 5 | 21.3 | 1.55 | No. 25 | PE |
| 24 | 0.295 | 38 | — | | 38 | 1.0 | 1.00 | — | CE |
| 25 | 0.261 | 53 | — | | 26 | 1.0 | 1.00 | — | CE |
| 26 | 0.501 | 110 | — | 125 | | 1.0 | 1.00 | — | CE |
| 27 | 0.026 | 15 | — | | 25 | 1.3 | 1.22 | No. 26 | PE |
| 28 | 0.006 | 8 | — | | 16 | 1.6 | 1.36 | No. 26 | PE |

PE: Present Example;
CE: Comparative Example

As can be seen from the results shown in Table 2, reduction of fine defect was achieved in all of the present examples, and the present examples had an improved fatigue life and an improved tool life in cold drawing over comparative examples that shared the same component, the same outside diameter, and the same wall thickness.

The invention claimed is:

1. A seamless steel pipe having:
a $t/D_{out}$ of 0.05 to 0.40, where t is a wall thickness (mm) of the seamless steel pipe, and $D_{out}$ is an outside diameter (mm) of the seamless steel pipe,
a maximum depth $d_{max}$ (mm)≤0.350 for defects in an inner surface of the seamless steel pipe in a cross section of the seamless steel pipe perpendicular to a pipe axis,
an average defect depth $d_{ave}$ (mm)≤0.200 for defects having a depth of 0.050 mm or more in the inner surface of the seamless steel pipe,
per millimeter of an inner circumferential length of the seamless steel pipe, at most 30 defects having a depth of 0.050 mm or more in the inner surface of the seamless steel pipe,
a chemical composition comprising, in mass %:
C: 0.05 to 0.45%,
Si: 0.05 to 0.45%,
Mn: 0.05 to 1.2%, and
Cr: less than 4.5%, and
a microstructure comprising ferrite grains having an average grain size of 15 µm or less.

2. The seamless steel pipe according to claim 1, having a microstructure comprising:
prior austenite grains having an average grain size of 15 µm or more.

3. The seamless steel pipe according to claim 1, wherein the chemical composition further comprises, in mass %, one or more selected from the group consisting of:
Ni: 0.5% or less,
Mo: 1.5% or less,
W: 2.5% or less,
N: 0.10% or less, and
B: 0.010% or less.

4. A method for manufacturing the seamless steel pipe of claim 1, the method comprising:
subjecting a steel billet to pierce rolling, wall-thickness reduction and stretch rolling to form a steel pipe; and
sizing the steep pipe according to the following formula (1):

$$(D_{ini}-D_{out})^2 \times t_0^2 \times GD^2 \leq 9980 \qquad (1),$$

where:
GD is an average grain size (mm) of austenite before sizing,
$D_{ini}$ is a steel pipe outside diameter (mm) before sizing,
$D_{out}$ is a steel pipe outside diameter (mm) after sizing, and
$t_0$ is a wall thickness (mm) before sizing,
thereby producing the seamless steel pipe of claim 1.

5. A method for manufacturing the seamless steel pipe of claim 2, the method comprising:
subjecting a steel billet to pierce rolling, wall-thickness reduction and stretch rolling to form a steel pipe; and
sizing the steep pipe according to the following formula (1):

$$(D_{ini}-D_{out})^2 \times t_0^2 \times GD^2 \leq 9980 \qquad (1),$$

where:
GD is an average grain size (mm) of austenite before sizing,
$D_{ini}$ is a steel pipe outside diameter (mm) before sizing,
$D_{out}$ is a steel pipe outside diameter (mm) after sizing, and
$t_0$ is a wall thickness (mm) before sizing,
to produce the seamless steel pipe of claim 2.

6. A method for manufacturing the seamless steel pipe of claim 3, the method comprising:
subjecting a steel billet to pierce rolling, wall-thickness reduction and stretch rolling to form a steel pipe; and
sizing the steep pipe according to the following formula (1):

$$(D_{ini}-D_{out})^2 \times t_0^2 \times GD^2 \leq 9980 \qquad (1),$$

where:
GD is an average grain size (mm) of austenite before sizing,
$D_{ini}$ is a steel pipe outside diameter (mm) before sizing,
$D_{out}$ is a steel pipe outside diameter (mm) after sizing, and
$t_0$ is a wall thickness (mm) before sizing,
to produce the seamless steel pipe of claim 3.

7. The method according to claim 4, further comprising:
subjecting the sized steel pipe to a heat treatment at a heating temperature in a range of 850 to 1,150° C. with at least 10 minutes of soaking retention time.

8. The method according to claim 5, further comprising:
subjecting the sized steel pipe to a heat treatment at a heating temperature in a range of 850 to 1,150° C. with at least 10 minutes of soaking retention time.

9. The method according to claim 6, further comprising:
subjecting the sized steel pipe to a heat treatment at a heating temperature in a range of 850 to 1,150° C. with at least 10 minutes of soaking retention time.

* * * * *